Jan. 27, 1942.    F. G. THWAITS    2,271,411
TANK CLOSURE
Filed Aug. 19, 1939    2 Sheets-Sheet 1

INVENTOR
F. G. Thwaits
BY
Morsell, Lieber & Morsell
ATTORNEYS.

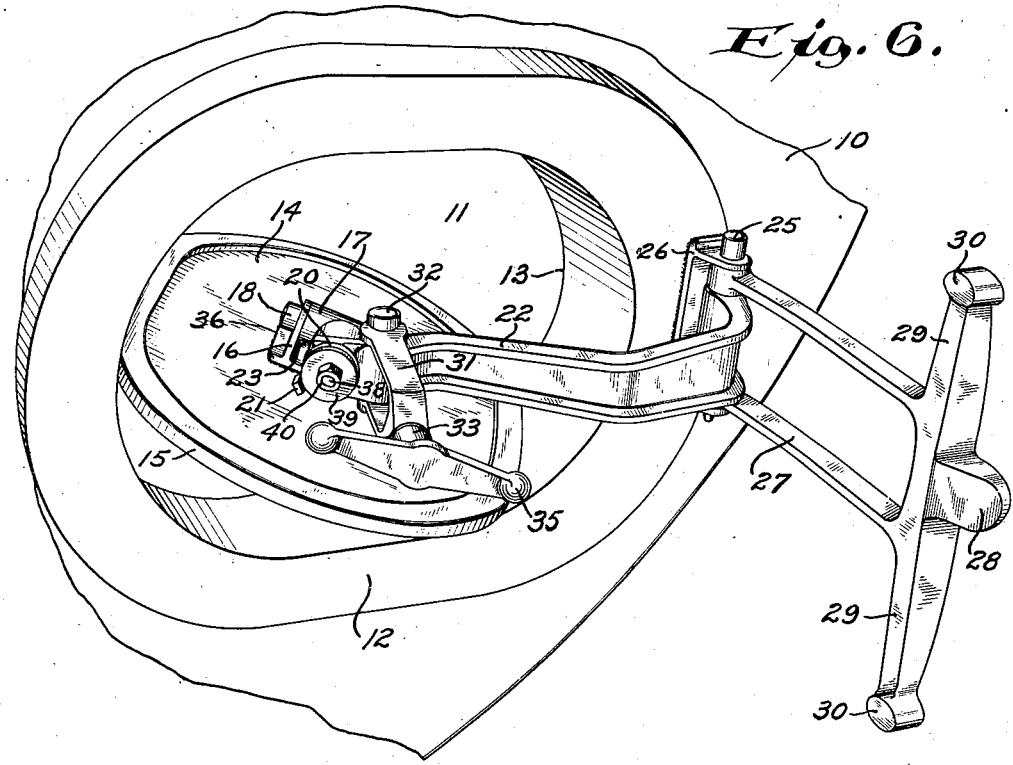
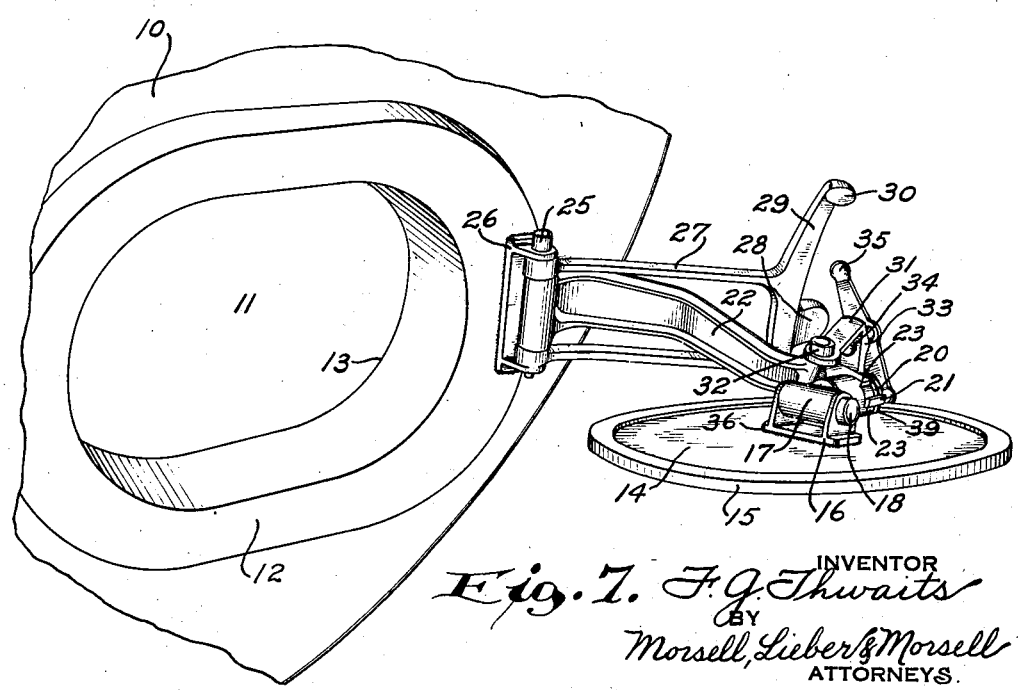

Patented Jan. 27, 1942

2,271,411

UNITED STATES PATENT OFFICE 2,271,411

TANK CLOSURE

Frederick G. Thwaits, Wauwatosa, Wis., assignor to The Heil Co., Milwaukee, Wis., a corporation of Wisconsin Application August 19, 1939, Serial No. 290,996

10 Claims. (Cl. 220—37)

The present invention relates in general to improvements in the art of handling and storing commodities which are subject to rapid deterioration and spoilage, and relates more specifically to improvements in the construction and operation of sanitary closures for milk storage tanks or the like.

Generally stated, an object of my present invention is to provide an improved closure especially applicable to milk storage tanks, which is simple in construction, readily manipulable, effective in use, and which may be conveniently cleaned and maintained in sanitary condition.

In the handling and storage of certain commodities such as milk, it is essential that all apparatus be maintained in clean and sanitary condition in order to prevent the milk from deteriorating in flavor and from spoiling. Milk is extremely susceptible of absorbing degrading odors and flavors, and of turning sour, if it is permitted to contact foreign matter lodged in corners or on the surfaces of containers and apparatus in which the milk is stored or treated, and it is therefore very important that such receptacles and treating apparatus be constructed so that it may be constantly maintained in clean and sanitary condition with greatest ease. This is especially true of the closures for manholes and inspection openings for milk storage tanks, and while the prior covers for such openings have heretofore been rather easily removable, they were not adapted to be conveniently dismantled, thoroughly cleaned and reassembled with minimum loss of time.

It is therefore a more specific object of my present invention, to provide a tank closure assemblage which besides being highly efficient in operation, is adapted to be quickly dismantled for thorough cleaning, and also readily reassembled.

Another specific object of the invention is to provide an improved sanitary closure for tanks and similar receptacles, which is devoid of corners and recesses such as screw threads in which foreign matter is apt to lodge, and which are subject to exposure to the contents of the enclosure.

A further specific object of this invention is to provide an improved mounting for internal manhole covers, which will permit quick removal and insertion of internally seated manhole closures or the like.

Still another specific object of my invention is to provide improved mechanism for supporting and for detachably clamping a tank closure in position, which may be manufactured at moderate cost and readily applied to receptacles of various types.

These and other specific objects and advantages will be apparent from the following description.

A clear conception of embodiments of the several features constituting this improvement, and of the mode of constructing and of utilizing tank closures built in accordance with the invention, may be had by referring to the drawings accompanying and forming a part of this specification wherein like reference characters designate the same or similar parts in the various views.

Fig. 6 is a perspective view of the improved tank closure, showing the mode of removing the cover through the manhole opening; and Fig. 7 is another perspective view of the assemblage, showing the cover completely removed from the tank and from the inspection opening.

Figure 2:
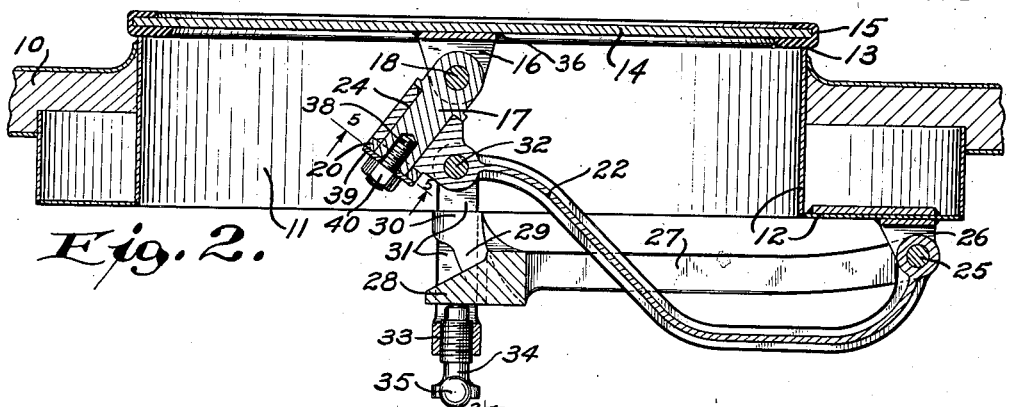
Fig. 2 is a central horizontal section through the assemblage of Fig. 1, taken along the line 2—2.

While the invention has been shown herein as being especially applicable to normally vertical closure covers adapted to be swung horizontally into and out of a milk storage tank, it is not my intention or desire to thereby unnecessarily restrict the scope or utility.

Referring to the drawings, the improved tank closure assemblage shown therein comprises in general a tank 10 having an inspection or manhole opening 11 in a side wall thereof and surrounded by a frame 12 having an elliptical seating 13 thereon within the tank 10; a flat approximately elliptical closure cover 14 having a detachable U-shaped resilient peripheral seal 15 cooperable with the seating 13 to seal the opening 11, and being provided with a pair of outwardly projecting ears 16; a cover supporting pin 17 to one end of which the cover 14 is swingably attached by a pivot pin 18 coacting with the ears 16, and the opposite end of which is provided with a flattened portion 19 snugly coacting with a collar 20 having oppositely directed stop lugs 21 thereon; a bent cover suspension lever or arm 22 having stops 23 and an inclined bore 24 at one extreme end and within which the pin 17 is journalled, and being provided at its opposite end with a supporting pivot pin 25 which coacts with a bracket 26 secured to one end of the frame 12; a T-shaped fork lever or bifurcated clamping arm 27 swingably suspended at one end from the pin 25 on opposite sides of the adjacent end of the arm 22, and having at its opposite end a central clamping projection 28 and two integral oppositely directed projections 29 the extreme ends 30 of which are adapted to coact with the top and bottom of the frame 12; a yoke 31 swingably suspended from the cover supporting arm 22 by a pivot pin 32, and having a threaded socketed end 33 adapted to be swung over the projection 28; and a screw threaded clamping spindle 34 coacting with the threaded yoke end 33 and having one end cooperable with the projection 28 while its opposite end is provided with operating handles 35.

Figure 3:
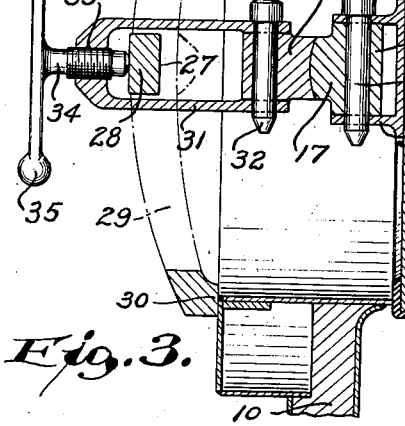
Fig. 3 is a central vertical section through the assemblage of Fig. 1, taken along the line 3—3 and showing the formation of the cut-away portion of the clamping arm or fork, in dot-and-dash lines.

The tanks 10 when used for milk, are ordinarily formed of corrosion resistant metal, and the frame 12 which is formed of similar material, is built up of plate stock welded together and to the tank wall so as to provide an approximately elliptical inspection opening 11 having its major diameter horizontal and its minor diameter vertical. The seating 13 which is likewise elliptical, lies in an approximately vertical plane, and the closure cover 14 comprises a flat elliptical piece of corrosion resistant sheet material over the peripheral edge of which the U-shaped resilient seal 15 is stretched and retained under tension. The seal 15 may be formed of a continuous strip of rubber or the like having U-shaped transverse cross section, and this continuous seal 15 may obviously be readily removed from and re-applied to the cover periphery and is adapted to snugly coact with the seating 13. The bracket which provides the ears 16, is preferably attached to the central outer portion of the cover 14 by smooth external and internal welds 36, 37 as shown in Fig. 3, and all of the corners of the tank, frame and cover assemblage which are exposed to the tank interior, are preferably smoothly rounded and devoid of dirt accumulating pockets or projections.

Figure 1:
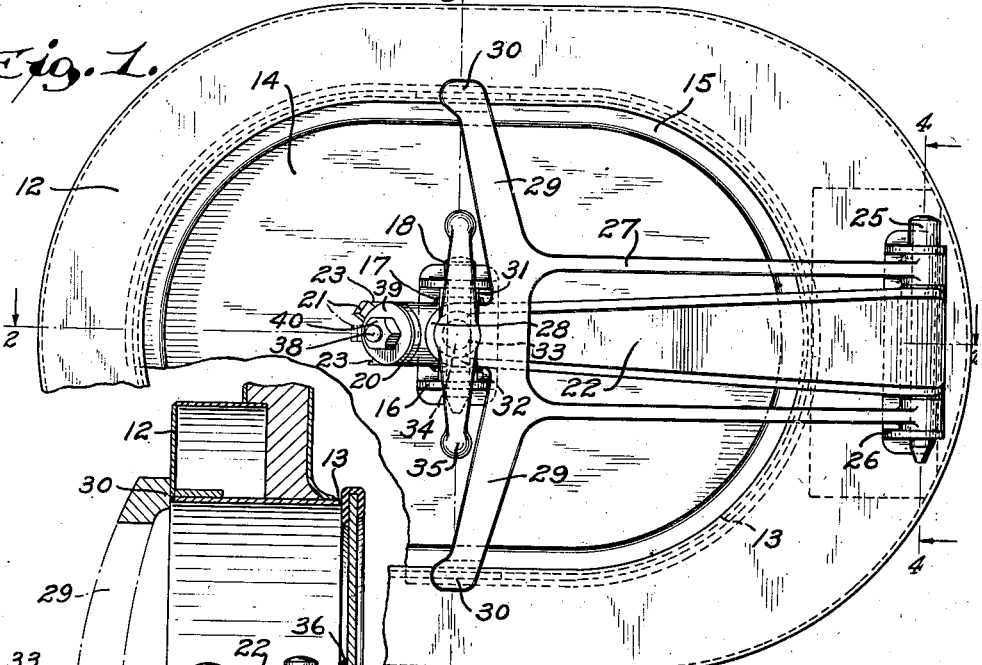
Fig. 1 is an outside view of one of the improved tank closures and manipulating mechanism, one corner thereof having been broken away, and showing the cover clamped shut.
Figures 4, 5:
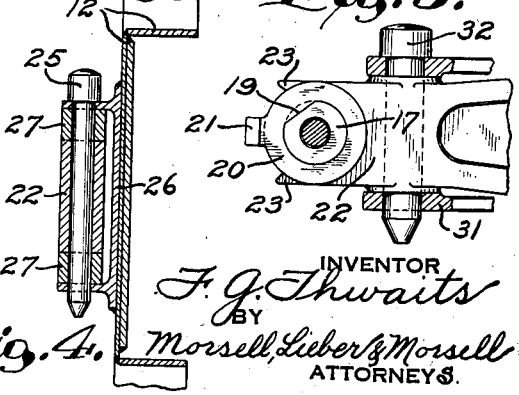
Fig. 4 is a vertical section through the hinge portion of the assemblage of Fig. 1, taken along the line 4—4.
Fig. 5 is an enlarged section through a fragment of the cover suspension mechanism, taken along the line 5—5 of Fig. 2.

The cover supporting pin 17 which coacts with the bore 24 at the swinging end of the lever arm 22, and one end of which is pivotally attached to the ears 16 by means of the pin 18 while its opposite end carries the stop collar 20, is provided at its end near the collar 20 with a threaded socket with which a stud 38 coacts, see Figs. 1, 2 and 5. A washer 39 embraces the stud 38 and engages the collar 20, and a nut 40 coacts with the stud 38 so as to hold the washer 39 and collar 20 in normal position while permitting ready removal of these elements. The collar 20 may be reversed with respect to the pin 17 so as to make either of the stop lugs 21 effective, and these lugs 21 are cooperable with either of the abutments or stops 23 so as to positively limit the swinging motion of the closure cover 14 about the longitudinal axis of the pin 17 and relative to the free end of the closure carrying arm 22. The arm 22 is bent as shown, in order to permit the cover 14 to be swung into the interior of the tank 10 out of alinement with the opening 11, thus leaving the opening 11 entirely clear of obstruction except for a relatively small portion of the arm 22 which hugs the side of the frame 12 nearest the bracket 26.

The bracket 26 may be welded or otherwise rigidly attached to the manhole frame 12, and this single bracket disposed at one side of the frame and opening 11, constitutes the sole means of support for the arms 22, 27 and for the elements associated with these arms. The closure supporting arm 22 and the clamping arm 27 should be of rigid and durable construction, and both of these arms 22, 27 may be swung clear of the opening 11 about the pivot pin 25. The yoke 31 may be swung over or clear of the projection 28 of the clamping arm 27, and by rotating the spindle 34 with the aid of the handles 35 when the assemblage is in the position shown in Figs. 1 and 2, the spindle 34 may be utilized to drive the clamping arm ends 30 into engagement with the frame 12 while at the same time urging the seal 15 into snug coaction with the seating 13. It is also to be noted that all of the pivot pins 18, 25, 32 are devoid of screw threads, and are held in normal position by gravity alone, thereby making them quickly removable.

During normal use of the improved tank closure, and assuming that the various parts have been properly constructed and assembled, the cover 14 may be closed and tightly sealed, as shown in Figs. 1 and 2, by merely manipulating the spindle 34 with the aid of the handles 35 so as to cause the clamping lever ends 30 to engage the outer surface of the frame 12, and to simultaneously cause the seal 15 to snugly engage the elliptical seating 13. With the cover 14 thus closed, the interior of the tank 10 is left free from undesirable projections and recesses at which foreign matter is apt to lodge.

When it becomes desirable to open the closure, it is only necessary to release the spindle 34 sufficiently to permit the yoke 31 to be swung clear of the projection 28 on the clamping arm 27. The arm 27 may then be swung clear of the opening 11 to the position shown in Figs. 6 and 7, and will no longer obstruct access to the opening. If it is desired to merely open the closure, the arm 22 which supports the cover 14 may be swung into the tank 10 and this swinging of the arm 22 may be continued until the cover 14 clears the opening 11 within the tank interior. If it is desired to remove the cover 14 from within the tank 10, the arm 22 may first be swung inwardly through the opening 11 sufficiently to permit the elliptical cover 14 to be swung to a position relative to the arm 22, substantially as shown in Fig. 6. The cover 14 in order to be placed in this position, must be swung about the axis of pivot pin 18, and also about the longitudinal axis of the pin 17, until the stop lug 21 engages the lower abutment stop 23 on the arm 22. The elliptical cover 14 when thus positioned, may be swung through the opening 11, as clearly illustrated in Fig. 6, by virtue of the fact that the minor axis of the elliptical cover 14 will then be disposed substantially in the plane of the major axis of the opening 11. The outward swinging motion of the cover 14 and of the arm 22 may, if desired, be continued to the position shown in Fig. 7, whereupon the opening 11 will be entirely free from obstruction. With the elements removed from within the tank 10, as shown in Fig. 7, the entire mechanism may obviously be readily dismantled by merely removing the pivot pins 18, 25, 32. In order to restore the closure within the tank 10, it is only necessary to reverse the operations or steps above described, and the cover 14 may be clamped into closed position by merely restoring the parts to the position shown in Figs. 1 and 2.

The use of a pivot pin 17 inclined relative to the plane of the cover 14 and having its end pivotally attached to the ears 16 of the cover is of importance and greatly facilitates insertion and removal of the elliptical cover through the opening 11, since it permits the cover to be freely turned in any direction. The ears 16 are also preferably secured to the cover 14 slightly off-center, that is farther away from the hinge side of the frame 12 than from the opposite side, and this off-setting of the pivot pin 18 also facilitates removal and insertion of the cover through the opening 11. The frame 12 is also of improved construction by virtue of the fact that this frame projects considerable distance outwardly beyond the outer surface of the tank 10, thereby not only improving the general appearance of the assemblage, but also preventing drippings from the opening 11 from flowing along the outer normally polished tank surface. While I have shown the arm 22 and the beam or arm 27 as being suspended from a common pivot pin 25, these arms may obviously be swingably suspended from independent pivot pins preferably having a common central axis of swing, and the side of the frame 12 to which the bracket 26 is attached, may be made somewhat wider than the other side in order to provide a stronger support. In practice, the various parts are preferably highly polished so that they may be conveniently cleaned and retained in sanitary condition.

From the foregoing specific description it will be apparent that my present invention provides an improved tank closure which is simple in construction, readily manipulable, and which effectively seals the opening 11, when assembled, as shown in Figs. 1 and 2. The various parts of the assemblage may be readily removed for inspection and thorough cleaning, and by virtue of the fact that the closure assemblage is suspended from one side only of the frame 12 which surrounds the opening 11, obstruction of this opening for access purposes is entirely eliminated. The elliptical cover 14 may obviously be readily shifted so as to avoid undesirable obstruction of the inspection opening 11 while retaining this cover within the tank, and this cover may also be quickly and conveniently removed from within the tank for inspection and cleaning. All parts of the assemblage, as well as the interior of the tank 10 adjacent the inspection opening 11, are freely accessible so as to permit the tank to be maintained in highly sanitary condition, and the pins which pivotally connect the various elements of the structure are not only conveniently removable but are also constructed so as to maintain most sanitary conditions. The improvement has proven highly successful, especially as applied to milk storage tanks, but may of course be applied to advantage, to other types of receptacles.

It should be understood that it is not desired to limit the present invention to the exact details of construction, or to the precise mode of manipulation and uses, herein shown and described, for various modifications within the scope of the claims may occur to persons skilled in the art.

I claim:

1. In combination, a tank having an opening, a cover for said opening, a pair of arms having corresponding ends swingably suspended to swing about a common axis located laterally of said opening, one of said arms having said cover secured to its swinging end and the other arm having its swinging end engageable with said tank, and adjustable means interposed directly between and coacting only with the swinging end portions of said arms for urging said cover towards closed position.

2. In combination, a tank having an opening, a cover for said opening, a pair of arms having corresponding ends swingably suspended from a common pivot at one side of said opening, one of said arms having said cover pivotally attached to its swinging end and the other arm having its swinging end formed for engagement with said tank on opposite sides of said opening, and a yoke pivotally suspended from one of said arms and being cooperable with the swinging end of the other for urging said cover towards closed position, said yoke being swingable laterally of said common pivot over and off of the end of said other arm.

3. In combination, a tank having an opening surrounded by a seating within the tank, a cover for said opening cooperable with said seating, a pair of arms swingably suspended from a common pivot located externally of the tank at one side of said opening, one of said arms having said cover suspended from its swinging end and the other arm having its swinging end provided with spaced abutments engageable with said tank, and a yoke pivotally suspended from said cover carrying arm and being cooperable with the swinging end of the other arm for urging said cover against said seating, said yoke being swingable laterally of said common pivot over and off of the end of said other arm.

4. In combination, a tank having an opening surrounded by a seating within the tank, a cover for said opening cooperable with said seating, a pair of arms swingably suspended from a common pivot located externally of the tank at one side of said opening, one of said arms having said cover suspended from its swinging end and the other arm having its swinging end provided with spaced abutments engageable with said tank on opposite sides of said opening, a yoke carried by the swinging end of one of said arms and being swingable independently of said cover over the other arm, and an adjustable spindle cooperating directly with said yoke and with the swinging end of the other arm to urge said cover against said seating.

5. In combination, a tank having an opening, a cover for said opening, a pair of arms having corresponding ends swingably suspended from a common pivot at one side of said opening, one of said arms having said cover pivotally attached to its swinging end and the other arm having its swinging end formed for engagement with said tank above and below said opening, a yoke carried by the swinging end of said cover carrying arm and being swingable over the swinging end of the other arm, and an adjustable spindle coacting with said yoke and with said other arm to clamp said cover against said tank adjacent to said opening.

6. In combination, a tank having an elliptical opening, a similarly elliptical cover for said opening, a suspension arm for said cover swingably suspended from said tank, a pair of pivots connecting said cover and the swinging end of said arm, said pivots having non-parallel axes, a clamping arm swingable about the axis of suspension of said cover suspension arm and having its free end engageable with portions of the tank, a yoke carried by the swinging end of one of said arms and being swingable over the swinging end of the other arm, and adjustable means coacting directly with said yoke and with said other arm to clamp said cover against said tank adjacent to said opening.

7. In combination, a tank having an opening, a cover for said opening coacting with the interior of said tank, a suspension arm for said cover pivotally attached to said tank at a side of said opening, a pivot pin journalled in the swinging end of said arm and having its axis disposed at an oblique angle relative to said cover, a pivot connecting said cover and said pin and having its axis disposed approximately parallel to said cover, a clamping lever pivotally attached to said tank to swing about the same axis as said suspension arm and having its free end engageable with portions of the tank, a yoke carried by the swinging end of said arm and being swingable over the free end of said lever, and adjustable means coacting directly with said yoke and with said lever to clamp said cover against said tank.

8. In combination, a tank having an elliptical side opening, an elliptical cover for said opening coacting with the interior of said tank, a suspension arm for said cover pivotally attached to the exterior of said tank and having its swinging end extended into said opening and disposed near said cover, a pivot pin journalled in said arm end and extending towards said cover, a transverse pivot connecting the inner end of said pin with said cover, said cover being swingable relative to said pin about said transverse pivot and also being swingable relative to said suspension arm about the axis of said pin, a clamping lever mounted to swing on the axis of swing of said arm and having its other end portion engageable with portions of the tank, a yoke pivotally suspended from the swinging end of said arm and cooperating with the swinging end of said lever, and adjustable means coacting with said yoke and lever to clamp said cover against the interior of said tank.

9. In combination, a tank having an opening, a cover for said opening, a pair of arms having corresponding ends swingably suspended from a common pivot at one side of said opening, one of said arms having said cover pivotally attached to its swinging end and the other arm having its swinging end formed for clamping engagement with said tank on opposite sides of said opening, a yoke carried by the swinging end of one of said arms and being swingable over the swinging end of the other arm, and an adjustable spindle coacting directly with said yoke and with said other arm to clamp said cover against said tank.

10. In combination, a tank having an elliptical opening, an elliptical cover for said opening coacting with the interior of said tank, a suspension arm for said cover pivotally attached to the exterior of said tank and having its swinging end extended into said opening and disposed near said cover, a pivot pin journalled in said arm end and extending toward said cover, a transverse pivot connecting the inner end of said pin with said cover, said cover being swingable relative to said pin about said transverse pivot and also being swingable relative to said suspension arm about the axis of said pin, a clamping arm mounted to swing on the axis of swing of said suspension arm and having its free end engageable with portions of the tank, a yoke pivotally suspended from the swinging end of one of said arms and cooperating with the swinging end of the other arm, and adjustable means coacting directly with said yoke and with said other arm to clamp said cover against the interior of said tank.

FREDERICK G. THWAITS.